3,005,028
11α-HYDROXY-A-NORPROGESTERONE

Richard W. Thoma, Somerville, and Frank L. Weisenborn, Middlebush, N.J., assignors to Olin Mathieson Chemical Corporation, New York, N.Y., a corporation of Virginia
No Drawing. Filed July 28, 1959, Ser. No. 829,967
1 Claim. (Cl. 260—586)

This invention relates to the synthesis of a new valuable compound and more particularly has for its object the provision of a process for preparing 11α-hydroxy-A-norprogesterone, and the new steroid formed thereby.

11α-hydroxy-A-norprogesterone, having the structural formula

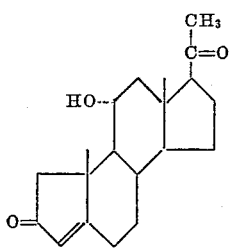

is prepared in accordance with the process of this invention by bringing together A-norprogesterone and the enzymes of the microorganism, Aspergillus nidulans, in an aqueous medium containing a source of nitrogenous factors and an assimilable source of carbon and energy, in the presence of oxygen, and recovering the 11α-hydroxy-A-norprogesterone formed.

In general, the conditions of culturing the microorganism for the purpose of this invention are (expect for the inclusion of the A-norprogesterone to be converted) the same as those of culturing microorganisms for the production of organic acids, antibiotics, etc., i.e., the microorganism is aerobically grown in contact with a suitable fermentation medium. A suitable medium essentially comprises a source of nitrogenous factors and a source of carbon and energy. The latter may be carbohydrate (such as sucrose, molasses, glucose, maltose, starch or dextrin), a higher fatty acid, a fat and/or the A-norprogesterone itself. Preferably, however, the medium includes an assimilable source of carbon and energy in addition to the A-norprogesterone. The sources of nitrogenous factors may be organic (e.g., soybean meal, corn steep liquor, meat extract and/or distillers solubles) or synthetic (e.g., composed of simple, synthesizable organic and inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture. The A-norprogesterone may be added to the culture during the incubation period or included in the medium prior to sterilization or inoculation.

11α-hydroxy-A-norprogesterone is a physiologically active compound which possesses anti-estrogenic activity and thus can be used in the treatment of disfunction in the menstrual cycle for which purpose it can be administered systemically (e.g., subcutaneously) being formulated for such administration in conventional injectable liquid carriers. In addition, 11α-hydroxy-A-norprogesterone is useful as an intermediate in the preparation of 9α-halo-11β-hydroxy-A-norprogesterones, as more fully described in the patent application of Frank L. Weisenborn, Serial No. 829,966, filed on even date herewith, now U.S. Patent No. 2,950,289.

The following example is illustrative of the invention (all temperatures being in centigrade):

EXAMPLE

11α-hydroxy-A-norprogesterone (a) *Fermentation.*—A medium of the following composition is prepared:

| | | |
|---|---|---|
| Corn steep liquor | g | 36 |
| Brown sugar | g | 10 |
| $NaNO_3$ | g | 6 |
| $KH_2PO_4$ | g | 1.5 |
| $MgSO_4 \cdot 7H_2O$ | g | 0.5 |
| $ZnSO_4$ (1% aqueous solution) | cc | 0.1 |
| $CaCO_3$ | g | 5 |
| Lard Oil | g | 2 |

Distilled water to make one liter.

50 ml. portions of the medium are distributed in each of five 250 ml. Erlenmeyer flasks and the flasks plugged with cotton and sterilized by autoclaving for 40 minutes at 120°. When cool, each of the flasks is inoculated with one loop of grown wheat grain containing *Aspergillus nidulans* (ATCC 11267), prepared as described hereinafter. The flasks are mechanically shaken for 20 hours on a rotary shaker (280 cycles/minute—2 inch radius) in a room maintained at 25°, after which time 10% transfers (by volume) are made to thirty-seven 250 ml. Erlenmeyer flasks (sterilized as described above), each containing 50 ml. of the following medium:

| | | |
|---|---|---|
| Corn steep liquor | g | 6 |
| $NH_4H_2PO_4$ | g | 3 |
| $CaCO_3$ | g | 2.5 |
| Soybean oil | g | 2.2 |

Distilled water to make one liter.
Steam-sterilized for thirty minutes at 15 p.s.i.g. and neutralized to pH 7.0 with sodium hydroxide solution.

Immediately after inoculation, to each of the second series of flasks is added 0.25 ml. of a 20 mg./ml. solution of A-norprogesterone in N,N-dimethylformamide. These flasks are then incubated under the same conditions as used for the first series of flasks for 24 hours, after which the contents of the flasks are pooled and filtered by suction through Seitz clarifying pads. [The inoculum used is grown from stock cultures of *Aspergillus nidulans* (ATCC 11267) for one week to three months in a medium of the following composition: wheat, 10 g. and distilled water, 15 cc.]

(b) *Isolation of 11α-hydroxy - A - norprogesterone.*—The aqueous filtrate obtained in step *a* (1972 ml.) is extracted four times with 250 ml. portions of chloroform. The combined chloroform extracts are washed with water, dried over sodium sulfate and evaporated to dryness under vacuum leaving a residue weighing about 197 mg. The residue is dissolved in benzene and chromatographed on 7 g. of acid-washed alumina. Elution of the column with benzene gives first about 11 mg. of 6β-hydroxy-A-norprogesterone, M.P. about 217–219°. Further elution with 50–100% chloroform-benzene gives 11α-hydroxy-A-norprogesterone. Recrystallization from ethyl acetate-hexane gives about 55 mg. of the product, M.P. about 183–184°; $[\alpha]_D +93°$ (chloroform);

$\lambda_{max.}^{EtOH}$ 233 mµ (log $\epsilon = 4.16$); $\lambda_{max.}^{Nujol}$ 2.90µ, 2.97µ, 5.88µ, 6.05µ, 6.18µ

*Analysis.*—Calcd. for $C_{20}H_{28}O_3$: C, 75.91; H, 8.92. Found: C, 75.81; H, 8.92.

The invention may be variously otherwise embodied within the scope of the appended claim.

What is claimed is:
11α-hydroxy-A-norprogesterone.

References Cited in the file of this patent
UNITED STATES PATENTS

| | | |
|---|---|---|
| 2,810,758 | Johnson et al. | Oct. 22, 1957 |
| 2,832,805 | Hoehn et al. | Apr. 29, 1958 |
| 2,863,806 | Dulaney et al. | Dec. 9, 1958 |
| 2,872,381 | Fried et al. | Feb. 3, 1959 |

OTHER REFERENCES

Peterson et al.: J. Am. Chem. Soc., vol. 74, pages 5933–36 (1952).